US007701499B2

(12) United States Patent
Barnea et al.

(10) Patent No.: US 7,701,499 B2
(45) Date of Patent: Apr. 20, 2010

(54) METHOD AND APPARATUS FOR IMAGING OF SCENES HAVING LARGE INTENSITY VARIANCE (75) Inventors: Daniel I. Barnea, Tel Aviv (IL); Noam Sorek, Zichron Yaacov (IL)

(73) Assignee: Bright Imaging Ltd., Omer (IL)

( * ) Notice: Subject to any disclaimer, the term of this patent is extended or adjusted under 35 U.S.C. 154(b) by 319 days.

(21) Appl. No.: 11/792,537

(22) PCT Filed: Dec. 6, 2005

(86) PCT No.: PCT/IL2005/001311

§ 371 (c)(1),
(2), (4) Date: Jun. 7, 2007

(87) PCT Pub. No.: WO2006/061828

PCT Pub. Date: Jun. 15, 2006

(65) Prior Publication Data

US 2008/0136953 A1    Jun. 12, 2008

Related U.S. Application Data (60) Provisional application No. 60/634,048, filed on Dec. 7, 2004.

(51) Int. Cl.
H04N 3/15 (2006.01)
H04N 5/243 (2006.01)

(52) U.S. Cl. .................................................... 348/308

(58) Field of Classification Search ............... 257/291, 257/292; 348/229.1, 308
See application file for complete search history.

(56) References Cited

U.S. PATENT DOCUMENTS 5,872,596 A    2/1999   Yanai et al.

(Continued)

FOREIGN PATENT DOCUMENTS

EP       1 233 613 A       8/2002

(Continued)

OTHER PUBLICATIONS

International Search Report dated Jul. 9, 2006, issued in PCT/IL2005/001311.

Primary Examiner—Jason Whipkey
(74) Attorney, Agent, or Firm—Venable LLP; Robert Kinberg (57) ABSTRACT The present invention is an electronic imaging device and method of expanding its dynamic range. The invention comprises modifying the imaging device by providing a comparator and reset trigger circuit located at or near the site of each of the pixels. The comparator triggers a reset mechanism when the voltage in the charged pixel reaches a reference voltage. During the global exposure time each individual pixel can be self-reset several times, depending on the intensity of the radiation incident upon it. At the end of the global exposure time, each pixel contains only the "residual value" of voltage that remains from the last individual self-reset to the end of the global integration time. An algorithm is implemented, which estimates and determines the number of resets undergone by each pixel during the global exposure time. From this number of resets the algorithm is able to reconstruct the true image. As opposed to prior art methods that make use of pixel reset the device of the invention does not contain electronic components for counting and remembering the number of times that each of the pixels was reset.

26 Claims, 2 Drawing Sheets

U.S. PATENT DOCUMENTS

| | | | |
|---|---|---|---|
| 6,130,713 A | 10/2000 | Merrill | |
| 6,175,383 B1 | 1/2001 | Yadid-Pecht et al. | |
| 6,831,689 B2 | 12/2004 | Yadid-Pecht | |
| 6,927,796 B2 | 8/2005 | Liu et al. | |
| 7,176,970 B2 * | 2/2007 | Lee et al. | 348/308 |
| 7,362,365 B1 * | 4/2008 | Reyneri et al. | 348/308 |
| 2002/0027606 A1 | 3/2002 | Yadid-Pecht | |
| 2002/0176067 A1 * | 11/2002 | Charbon | 356/4.01 |
| 2003/0015647 A1 * | 1/2003 | Guo et al. | 250/208.1 |
| 2003/0058356 A1 * | 3/2003 | DiCarlo et al. | 348/241 |
| 2003/0058360 A1 * | 3/2003 | Liu et al. | 348/308 |
| 2004/0136603 A1 * | 7/2004 | Vitsnudel et al. | 382/254 |
| 2005/0051707 A1 * | 3/2005 | Bamji et al. | 250/208.1 |

FOREIGN PATENT DOCUMENTS

WO     WO 93/14595     7/1993

* cited by examiner

METHOD AND APPARATUS FOR IMAGING OF SCENES HAVING LARGE INTENSITY VARIANCE

FIELD OF THE INVENTION

The present invention relates to the field of generating and processing of electronic images. In particular the invention relates to methods and apparatus for the capture and reproduction of improved intensity variance of such images.

BACKGROUND OF THE INVENTION

Numerous everyday scenes have a far greater intensity variance range than can be recorded on an electronic imaging apparatus (e.g., a still or video camera). This is because electronic imaging apparatus exhibit limited dynamic range (response) i.e. the exposure time, which must be long enough for sufficient electronic detection of shadowed areas has to be at the same time, short enough to prevent saturation within high intensity areas. This is an impossibility for most images. The result of the limited dynamic range thus becomes a compromise, leading to reduced detail in both shadowed and highlighted regions. The deep shadows are recorded as undifferentiated black and the bright highlights are "washed out" as undifferentiated white.

Scenes with a high dynamic range, having both strong highlights and important shadow detail cannot be imaged with substantial fidelity. In effect, the operator must choose how much of the tonal scale is to be sacrificed. Consider, for example, an image of an individual in front of a bright window. Exposing for the person will result in the window part appearing as a uniformly white background shape, while exposing for the outdoor scene visible through the window turns the person into a black image or a silhouette.

In electronic photography, images are represented as an ordered series of picture elements, or "pixels", arranged in a linear or planar grid. On the display, each pixel will ordinarily specify a luminance or brightness value and chrominance values that specify the color of the pixel. Intensity variance is typically characterized in terms of image "depth", referring to the number of discrete brightness levels that the system is capable of resolving and displaying.

A number of methods have been suggested in the past to overcome this problem. Methods that include exposing the camera using different exposures and combining the resultant images in various ways are among the more frequently used methods. The different exposures can be obtained by changing the integration time, which is the time that the pixel is exposed to incoming light, or by adjusting the amount of incoming light that falls on some or all of the pixels. Integration time for each frame begins with a reset signal and ends with a sample signal, i.e. the reading. In prior active pixel sensors (APS) having global control, all pixels in the sensor array are reset and later sampled at the same time.

The problems with these methods are in two areas. Firstly, in each exposure, any movement in the image, real movement in the scene or camera movement, is translated differently in different exposure times and as a result the overall image, obtained by combining the different exposures, becomes distorted. The second area in which problems arise is the response of the system to strong changes in the intensity of the scene. In some systems the ratio of the exposures is kept constant, and then the coverage of the intensity variance of the real scene is not optimal. In others, the exposures are changed independently and it takes long time to adapt to a new scene.

Many of the prior art methods that attempt to solve the problem of the limited dynamic range of electronic cameras such as those based on CCD technology and especially CMOS detectors make use of a technique known as pixel reset. In this technique additional electronic circuitry is added to the pixel array and additional steps to the image processing algorithms in order to reset the pixels a number of times during each integration time for the frame. The total number of photons (charge) accumulated during the entire integration time for the frame is then determined by adding up the total number of photons accumulated per each reset of the pixel with the addition of the accumulation after the last reset. This technique is accomplished in a variety of ways. In some cases, the entire array of pixels is subject to resets, which occur according to a preset criterion, usually based on time.

In other methods, each individual pixel is provided with circuitry which resets the pixel when it has filed up to a certain level. Additional circuitry associated with each pixel counts and remembers the number of resets for the pixel. Various publications teach different methods for determining the criterion for resetting the pixel to zero and for determining the total integrated charge. In the most basic sense the total integrated charge for each pixel is the residual charge measured at the time of the sample signal plus the number of resets times the amount of charge allowed to accumulate before the pixel is reset. Variations of this method of extending the dynamic range are taught for example in U.S. Pat. No. 6,831,689, U.S. Pat. No. 6,927,796, U.S. Pat. No. 5,872,596, and in international patent application WO 93/14595. The common disadvantage of all the prior art methods of individual pixel reset, especially for CMOS cameras, is the additional cost of extra counting and memory circuitry, or analog type accumulators in other solutions, which must be added at each pixel site. Also, there is the fact that additional circuit elements require space, thereby effectively reducing the light gathering ability of the array or increasing its size with attendant cost increases and signal/noise problems. One solution to the space problem is to remove the counting and memory storage elements from the pixel site to the central processing area of the detector. This solution, however, requires also cumbersome signal sampling and transfer procedures that affect the overall performance of the detector. It may also impose limitations on the actual time each pixel can perform its reset cycle, if the design imposes the need for the "attention" of the central processing unit. Therefore this method reduces the accuracy and sensitivity of the solution.

It is therefore a purpose of the present invention to provide a method and apparatus for imaging of scenes having large intensity variance.

It is another purpose of the present invention to provide a method and apparatus for expanding the dynamic range of an electronic camera necessitating a relatively small amount of functions of the circuitry or, by providing a relatively small hardware change to existing pixel arrays and augmenting an image processing technique to estimate and determine the true value of the intensity of the light gathered by each individual pixel in the array.

Further purposes and advantages of this invention will appear as the description proceeds.

SUMMARY OF THE INVENTION

In one aspect the present invention is a method of expanding the dynamic range of an electronic imaging device. The method comprises the following steps:

a. providing a sensor chip comprised of a one or two-dimensional array of pixels and a centrally located sensor-chip logic area, wherein the global exposure time interval of a frame begins with reset signals and ends with sample signals;

b. providing a comparator and reset trigger circuit located at or near the site of each of the pixels. The comparator triggers a reset mechanism when the voltage in the charged pixel reaches a reference voltage and, during the global exposure time, each individual pixel can be self-reset several times, depending on the intensity of the radiation incident upon it. At the end of the global exposure time, each pixel contains only the residual value of voltage that remains from the last individual self-reset to the end of the global integration time; and c. providing an algorithm implemented on post acquisition data, wherein the algorithm comprises steps of:
  i. using a time and/or space continuity assumption and an adjacent pixel inference rule to determine the number of individual resets for each of the pixels; and
  ii. using the determined number of individual resets for each of the pixels, the residual value for each of the pixels, and a basic formula to determine the true image value for each of the pixels.

The true image is comprised of an array of the true image values for each of the pixels. The combination of the reset mechanism for each pixel in conjunction with the use of the algorithm allows the determination of the true image without the necessity of providing electronic components for counting and remembering the number of times that each of the pixels was reset.

In preferred embodiments of the invention the electronic imaging device comprises a CMOS sensor chip.

The starting reset signals for the global exposure time interval of a frame can be the same or different starting signals can be applied to various sub-arrays.

In different embodiments the threshold for the pixel saturation-reset signal can be global or different threshold mechanisms can be used for each sub-array of pixels. The threshold-reset mechanism can be operated by a central reset-enable signal and resets can occur when a pixel value has reached the threshold value and the reset-enable signal is on. The compare and threshold-reset electronics can be time shared by a group of pixels; wherein during a predetermined sequence, each pixel is connected to the electronics and a reset is generated to the pixel if it has passed the threshold. The threshold-reset mechanism can sample one pixel, or an average of several pixels, and then perform the reset on a group of neighboring pixels, including the pixels that were sampled. The source of the reference voltage that determines the reset value can be provided from the central location in the sensor-chip logic area In one embodiment of the invention it is assumed that the continuity assumption holds for the whole image and the algorithm comprises the following steps:

a. choose a trajectory of pixels, which are ordered for sequential treatment of the algorithmic process;

b. visit each pixel along the trajectory following a visit to an adjacent neighbor;

c. determine sequentially the n-values for each pixel by using the continuity assumption and the adjacent pixel inference rule relative to one or more of the already visited pixel values; and d. calculate the true image using the basic formula.

In this embodiment it can be assumed that there exists a finite, yet small, probability that the continuity assumption may be violated for some inferences of adjacent n-values, resulting in a few wrong n-inferences along specific trajectories used to visit a pixel. In this case the resulting errors are corrected by introducing correction procedures into the algorithm; wherein such procedures comprise:

a. determining the n-values of the pixels by employing, for the whole pixel array, a succession of iterations utilizing trajectories with different pixel orderings, which will identify violations automatically and gradually converge to a reduced (or zero) number of n-errors.

b. grouping the pixels into relatively ordered n-sets, after error corrections if necessary;

c. assigning the value n=0 to the lowest set in the order;

d. assigning higher n values in order, for the other n-sets, in a consistent manner, up to the highest n value; and e. incorporating a determined confidence level associated with each estimated n-value in the estimate of the following n-values, The first step of this procedure is comprised of the following steps:

a. determine a trajectory of pixel visits.

b. make the n-inference for each new pixel from all of the adjacent pixels that have already been estimated or reference neighbors;

c. produce an estimate of an integer n-step, on the basis of the relevant inference details including incorporation of previously determined confidence levels associated with earlier estimates, if all the n inferences for said new pixel are not identical;

d. assign a "non-final" estimate for the n-value of said pixel;

e. interrupt and change said original trajectory, when necessary, so as to approach said "non-finalized" pixel from a different direction;

f. estimate the n-value again incorporating said new trajectory;

g. generate a new maximum likelihood estimate by including all the additional reference pixels;

h. adopt said new estimate if it is consistent with all the previously generated estimates;

i. repeat steps e to g if said new estimate is not consistent with all the previously generated estimates;

j. repeat steps a to i for all the regions of the image, until all pixel inferences are completed; and k. apply combinatorial trials of modified estimates if there are left pockets of inconsistent estimates until consistencies are achieved.

The estimate of an integer n-step can be made using a maximum likelihood type of estimate.

In another embodiment of the method of the invention the array of pixels is divided into a main group of pixels that are reset individually during the global exposure time interval whenever the voltage of the individual pixel of the main group reaches the reference voltage and a sparse sub-array of pixels whose integration time or sensitivity are altered such that the voltage of essentially all of the pixels of the sub-array reaches the reference voltage only if the light intensity on such pixel is higher then a predetermined maximal light intensity. The sub-array can be created by making a small hardware modification such that the pixels of the sub-array will have an integration time which is shorter than the global exposure time interval. A reduced sensitivity for the sub-array, could be achieved by use of an attenuating cover, which would reduce the intensity of the radiation falling of the covered pixels.

For this embodiment, the algorithm comprises the steps of:

a. estimating, by direct calculation, the n-value for each of the pixels of the sub-array;

b. apply the n estimates for the sub-array and the continuity rules to estimate the n-values for the main array by making for each sub-array estimate inferences concerning the group of nearest neighboring pixels in the main array;

c. use the estimated values of n for each pixel in the main-array to calculate the "true values" of the pixels in the main array, and d. calculate the compatibly scaled "true values" of the sub-array by direct compensation for the shortness of their integration time interval.

Additional steps of data smoothing using the final results for the main array can be carried out to smooth the values of the potentially noisier sub-array pixels.

In another embodiment of the method of the invention two adjacent exposures having different exposure times are used. The first exposure time is the global exposure time interval and the pixels are reset individually whenever their voltage reaches the reference voltage. The second exposure time is shortened such that the voltage of essentially all of the pixels reach the reference voltage only if the light falling on these pixels is stronger then a predetermined maximal light intensity. The method comprises the steps of:

i. estimating the n-values of the pixels of the short exposed image and, ii. using said n-values to reconstruct the true n-values of the pixels of the global exposure time image.

Using this method, motion artifacts can be corrected by the following steps:

a. applying a registration method comprising repeatedly trying incremental shifts between the residual image of the full exposure time image and the reconstructed estimate of residual values derived from the short exposure time image until maximal correlation is achieved;

b. deriving the n-estimates for the pixels of the short exposure and associating the n-estimates to the registration fitted pixels of the long exposed image, and c. estimating the true n-values for the pixels of the global exposure time image from the n-estimates.

Another method for correcting motion artifacts is based on applying a registration method that adaptively and successively treats different image regions.

The method of the invention can be applied to electronic imaging devices comprising pixels sensitive to light having one color or subsets of pixels each of which is sensitive to the same or different colors. The comparator can be connected to each pixel site in one of the following ways: a comparator can be located at each of the sites; each of the sites can be connected to a comparator shared by a group of pixels; and a group of sites can be connected to a single comparator and additional circuitry with the resultant reset affecting a group of neighboring pixels that can or can not be members of the group connected to the comparator.

In another aspect the invention is an electronic imaging device having expanded dynamic range. The device comprises:

a. a sensor chip comprised of a two-dimensional array of pixels;

b. a centrally located sensor-chip logic area, comprising circuitry for controlling the global exposure time interval of a frame beginning with reset signals and ending with sample signals;

c. a comparator and reset trigger circuit located at or near the site of each of the pixels, wherein the comparator triggers a reset mechanism when the voltage in the charged pixel exceeds a reference voltage; whereby, during the global exposure time, each individual pixel can be self-reset several times, depending on the intensity of the radiation incident upon it, and, at the end of the global exposure time, each pixel contains only the residual value of voltage that remains from the last individual self-reset to the end of the global integration time; and d. processing circuitry for carrying out at least part of an algorithm which uses the residual values of voltage to determine the true image value for each of the pixels.

The true image acquired by the device is comprised of an array of the true image values for each of the pixels. The combination of the reset mechanism for each pixel in conjunction with the use of the algorithm allows the determination of the true image without the necessity of providing electronic components for counting and remembering the number of times that each of the pixels was reset.

The electronic imaging device of the invention can comprise pixels sensitive to light having one color or subsets of pixels each of which is sensitive to the same or different colors. The comparator of the imaging device can be connected to each pixel site in one of the following ways: a comparator can be located at each of the sites; each of the sites can be connected to a comparator shared by a group of pixels; and a group of sites can be connected to a single comparator and to additional circuitry with the resultant reset affecting a group of neighboring pixels that can or can not be members of the group connected to the comparator.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The present invention utilizes individual pixel reset to vary the residual integration time of individual pixels and processing of the signals from each pixel to increase the dynamic range of each pixel independently. The inventors estimate that the modifications needed to the area of a conventional chip will result in an increase in the chip area, and thus in production cost, of a maximum of some 15%. The relatively simple and low cost modification of the sensor chips will be introducible to the majority of cameras that are in use. This will render a dynamic range that will compete with cameras that derive an expanded dynamic range, by using more expensive technologies such as built in refrigeration methods, The method of the invention is applicable for different electronic image sensing devices and systems and is especially suitable for CMOS sensor chips. The basic dynamic range of a CMOS sensor is 8 bits or less, which is inferior to that of CCD chips. The method of the invention allows an increase in the dynamic range of sensors by a factor of four times and more, thereby achieving a capability of 10 bits and beyond. Thus, the invention provides the industry with an easy and low cost means to not only overcome the inferiority of CMOS chips but also to produce CMOS chips that outperform current CCD chips in dynamic range performance.

The individual pixel reset (IPR) of the invention can be used to achieve a very large intensity variance. The basic integration time/interval is determined by the sensitivity (and signal-to-noise ratio) required for the darkest areas of the image. The intensity variance (or the dynamic range) of the scene corresponds to the maximal number of saturation resets N that will occur for any of the brightest areas (pixels).

The usefulness of the present invention will start already from N=1. Its use will considerably improve or even save many common pictures. Therefore, even relatively simple reconstruction methods that do not take into account the handling of artifacts will have value.

Integration time begins with a reset signal and ends with a sample signal. In prior active pixel sensors (APS) having global control, pixels are all reset at and sampled at the same time interval. In the present invention, after the first reset, the reset times for each pixel are determined individually. This allows each pixel to have a different integration time. Reset is achieved by electronics that is centrally located for the global interval start reset signals and sample and threshold signals located at and near the pixel site for the saturation-reset signal. When each individual pixel level exceeds the predetermined threshold the pixel is reset. During the global exposure time, each pixel can be self-reset several times, depending on the intensity of the radiation incident upon it. At the readout time of the sensor, after the global exposure time, each pixel would contain only the residual value from last individual self-reset to the end of integration time.

In one embodiment the threshold for the pixel saturation-reset signal can be global. In other embodiments different thresholds can be used for each sub-array of pixels. One arrangement of the sub-array can be the pixels in every n'th line and every m'th row.

The compare and threshold reset electronics is preferably located at each pixel. It can be implemented in some embodiments of the present invention for a group of pixels by means of shared electronics; thereby enabling a more efficient threshold and reset mechanism while minimizing the average added electronics per pixel.

In one embodiment the threshold-reset mechanism is operated by a central 'reset-enable' signal, comprising pulses that occur at a predetermined sequence. Resets will occur when a pixel value has reached the threshold value and the reset-enable signal is on. The central reset-enable signal enables threshold-reset electronics that would consume less power. The restoration algorithm, to be described hereinbelow, would take into account the time quantization of the reset signal.

In another embodiment the compare and threshold-reset electronics are time shared by a group of pixels, e.g. a line of pixels or part of a line. During a predetermined sequence, each pixel is connected to the above mentioned electronics and a reset is generated to that pixel if it has passed the threshold. Since the reset sequence is predetermined, the restoration algorithm can treat the sequence at time quantization in the reset sequence.

In another embodiment of the invention the threshold-reset mechanism samples one pixel, or an average of several pixels, and performs the reset on a group of neighboring pixels, including the pixels that were sampled. The sampled pixels are restored by the standard restoration algorithm as described hereinbelow.

The hardware modifications that are made to the chip can be made in a similar fashion for any pixel, regardless of its color. Such modifications can be made and integrated into the chip array and central circuitry, by any person skilled in the art. The addition to the normal pixel circuitry, is a comparator that triggers a reset (usually for the standard reset mechanism) when the voltage in the charged pixel exceeds a reference voltage. This reference is normally generated in the central chip logic. The residual reading (sampling), for each pixel, is then stored into the image memory, in the standard form, at the end of the integration time.

Within the exposure time interval T each pixel of the modified chip is reset (normally at the beginning of integration time) to a logical zero, represented by some value $V_m$, whenever the accumulated charge due to impinging photons reaches a value having a corresponding reference voltage $V_M$, which is lower then saturation value $V_S$). It is to be noted that the concept of resetting to zero is a logical one and does not necessarily correspond to physical zero of the voltage or charge. Typically $V_M$ is chosen to be some percentage less than $V_S$. Such resetting will occur at any random time that the value of $V_M$ is reached or, in other embodiments of the present innovation, at a time controlled by central or local electronics, if the value is equal or higher than $V_M$ (note that this sentence refers to logical values for the case in which saturation is the high value). Each reset is followed by a recovery time which is short relative to the time interval T, after which light/charge accumulation starts again. By the end of the exposure interval T, the pixel has been reset n times, where $0 =< n < N$. The final reading is some "residual value" $V_R$, which is the accumulation in the interval between the last random reset and the end of the exposure time interval T. The corresponding value for the total accumulated value of the pixel $V_T$, known as the "true pixel value", is therefore, for the random time embodiment, $V_T = (n \times V_M - V_m) + V_R + $ epsilon, where n is the number of random resets of the pixel prior to the end of the exposure interval T and epsilon is a correction factor, compensating for photons lost during the n reset recovery-times. The determination of n and the magnitude of the corresponding true pixel value are done during the image reconstruction stage using a signal processing algorithm implemented in software or dedicated hardware.

In some embodiments it is required to compute the time $T_R$ during which the residual value $V_R$ is collected. This can be done using the equation $T_R = T - T_n$, where n is the number of resets, $T_n$ is the time of the nth reset, and T is the global exposure time. The value of the pixel Vt is therefore: $Vt = V_R * (T/T_R) + $ (a correction factor). This equation is exactly true for the pixel upon which the resetting is directly based. For neighboring pixels, $T_R$ is the same unless a known delay is computable.

Examples of preferred embodiments of signal processing algorithms will be described hereinbelow.

In one embodiment the reference voltage $V_M$ that determines the reset value (event) is provided from a central location in the sensor-chip logic area leaving for the pixel area only the comparator circuitry. In other embodiments, the comparator circuitry is shared by a group of pixels for further reduction of the area per pixel. Therefore the fill factor of the active (photon accumulating) pixel area is thus likely to be changed by a minimal area. Accordingly, the basic sensitivity of the pixel active area during a given exposure interval is left substantially unchanged. On the other hand, the "effective saturation level" (equivalent to "dynamic range") of the pixel becomes significantly higher.

The total hardware modification that distinguishes the chip of the invention from conventional chips comprises: a) a comparator and reset triggering circuitry for each pixel or shared by a group of pixels b) voltage reference circuitry in the logic area, which is common for all pixels, c) some enhancements in the processing part inside or outside of the chip, where the image reconstruction is performed and stored. It is to be noted that no counter circuitry or special memory is built to record the number of random resets for each of the pixels in the pixel array. This differentiates the present innovation from prior art solutions which employ pixels having self reset mechanisms. As said previously, since the fill factor of the pixel's active area, is changed due to the addition of less circuitry, the general sensitivity will accordingly be less affected.

The extra expense in implementation of the computational methods required by the invention is limited since they are confined to the processing circuitry the cost of which, unlike that of the active sensing area, is continuously decreasing.

The exploitation of the increased dynamic range provided by the invention, can be done via an increasing amount of processing or display means; such as newer display means with larger "contrast ratios" and methods of Z-compression. Recently developed display technologies and new compression methods are making both of these types of alternatives more and more available at decreasing costs.

Figure 1:
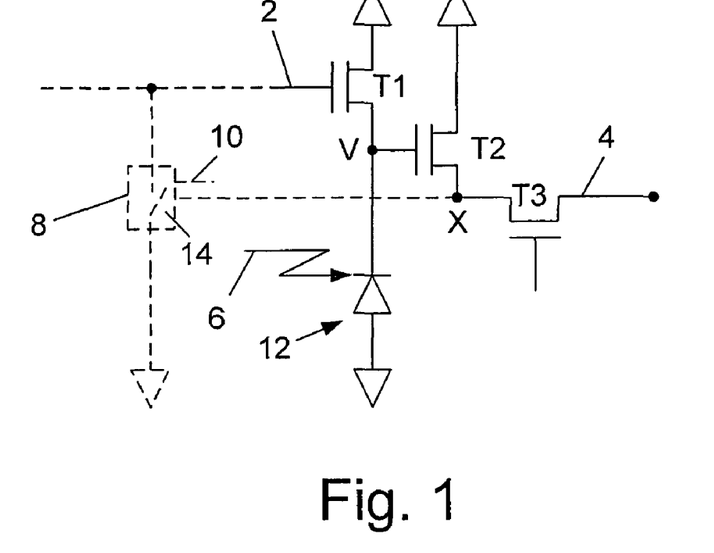
FIG. 1 is a schematic block diagram showing one arrangement for providing the individual pixel self-reset according to the invention.

FIG. 1 is a schematic block diagram showing one arrangement for providing the individual pixel self-reset according to the invention. In the figure the solid lines show the circuit for a prior art CMOS pixel comprising three transistors. At the beginning of the global exposure time interval a reset signal is sent to the pixel from the central control area to the pixel through reset line (2). At reset, junction V is pre-charged to its maximum voltage, i.e. to logical zero. During the exposure time incoming light (6) from the scene falling on the light diode (12) and discharges junction V. Transistor T2 acts as a source follower to drive the read-out line (4). At the end of the global time interval a signal is sent from the central control area to transistor T3 of the pixel. This signal opens T3 thereby connecting Ts to the read-out line (4) and allowing the voltage at junction V at the end of the exposure to be read.

In FIG. 1 dashed lines are used to show the additions that are made to the prior art pixel circuit according to the present invention. A threshold mechanism comprised of comparator (8) is added to the circuit in order to constantly compare the voltage level at X, the output of T2 to a threshold value $V_M$ (10) supplied from the central control area. When the voltage level at X becomes lower than the threshold value then the switch (14) is closed creating a reset pulse, which resets the voltage at junction V to logical 0.

In the embodiment shown in FIG. 1, the global exposure time reset can be created either by pulling the reset line to a low voltage or by driving the threshold value to a high value. The embodiment shown in FIG. 1 is provided as an example to illustrate the invention and skilled persons will be able to devise other ways of implementing the individual pixel mechanism and adapting it to other types of pixel circuits with relative ease.

Figure 2:
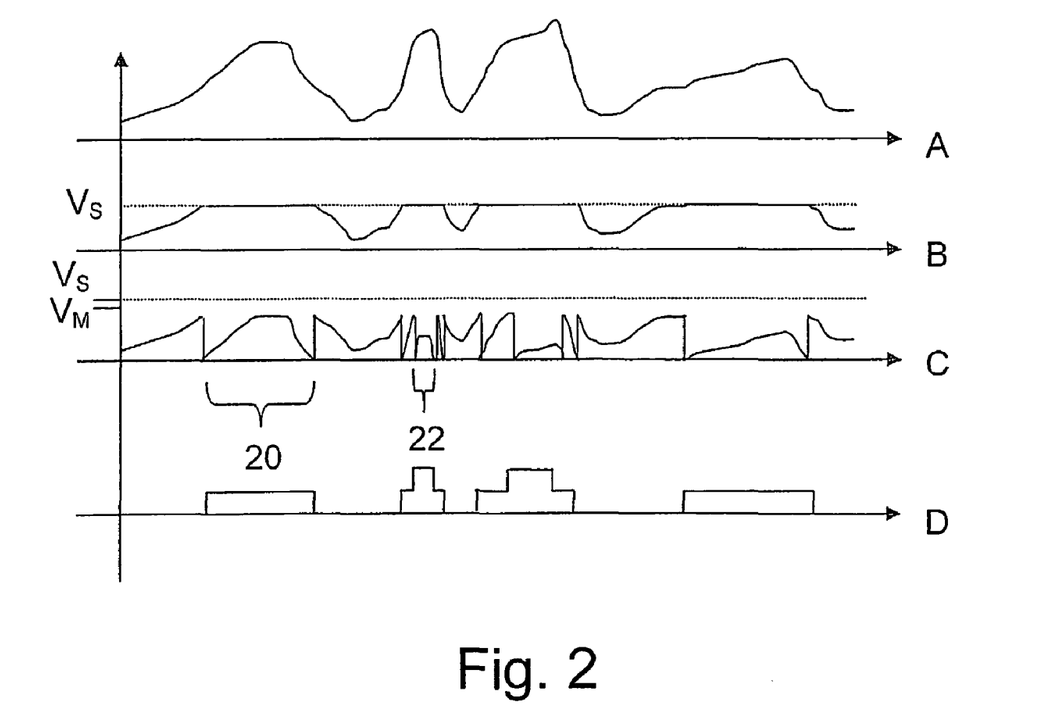
FIG. 2 shows schematic readouts from part of a line of pixels in a sensor array.

FIG. 2 shows schematic readouts of logical values and voltage values from part of a line of pixels in a sensor array. Curve A is the theoretical readout assuming the pixels of the sensor have a sufficiently large saturation values $V_S$ that was not exceeded. Curve B is the readout that would be obtained with a standard imager having limited dynamic range. The dotted line is the saturation level $V_S$ of the sensor. Curve C is the theoretical readout that would be obtained from the sensor of the invention. Curve C shows how the voltage at junction V (see FIG. 1) varies with time during the global exposure time for each of the pixels. $V_S$ is the same as for the sensor in curve B, however the individual pixels are reset whenever the charge reaches the reset value $V_M$. In curve C the pixels identified by numeral 20 have been reset one time and the pixels identified with numeral 22 have been reset two times. Curve D shows the output that would be obtained from the reset counters for each pixel if such components were added to the circuitry shown in FIG. 1 as is done in prior art methods of providing resets of the pixels during the global exposure time.

Figure 3:
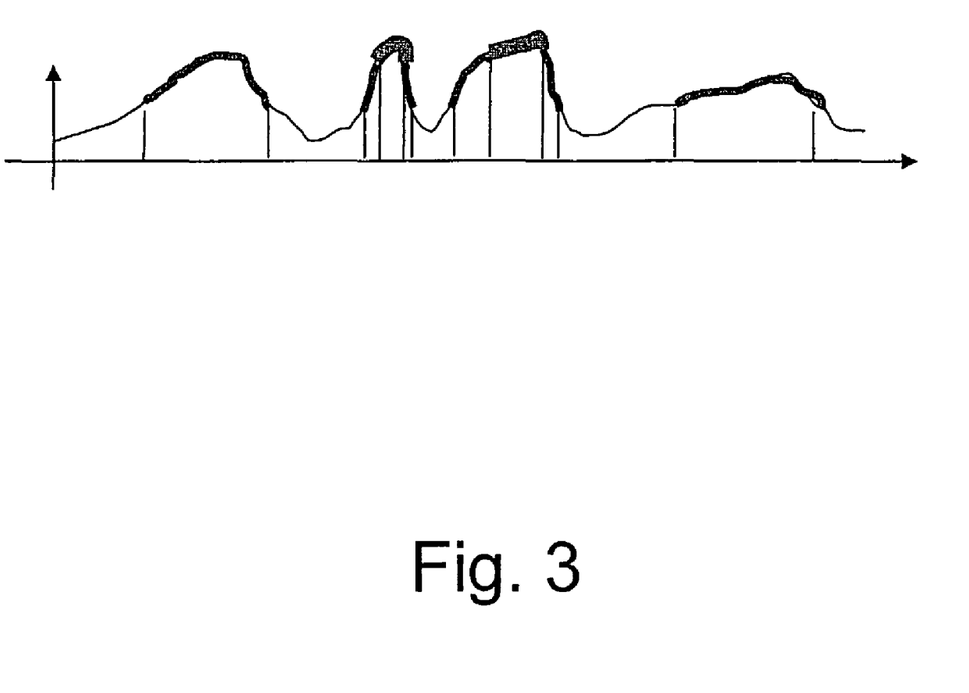
FIG. 3 shows the readout of a line of pixels in a sensor array reconstructed according to the method of the present invention.

FIG. 3 shows the readout of curve C of FIG. 2 reconstructed according to the method of the present invention. The vertical lines show the resets of the individual pixels and the dark sections of the curve are the parts that have been reconstructed using a reconstruction algorithm such as one of those described hereinbelow.

As will be recalled from the description hereinabove $V_T$ can be calculated as a function of n, the number of resets for the pixel (with variations that will depend on the specifics of the method used to perform the reset). The problem to be solved in order to calculate the reconstructed image is to estimate and determine the value of n for each pixel. In the prior art a hardware approach to the problem is used wherein components that provide individual counting and memory functions for each pixel are added to the circuitry. The present invention provides, instead, a computational solution to the problem.

Before giving some examples of ways in which the number of resets can be determined a list of the notation used herein is now presented:

T=the exposure time interval during which the photons were allowed to accumulate independently in each pixel.

$V_T$=the true image value, i.e. the value of the pixel voltage or charge when there is no saturation.

$V_T$ij=the true image pixel value for the pixel in row i and column j.

VT a compound image comprised of the $V_T$ij values.

n=The number of resets (discharges) that have occurred during the exposure interval T.

nij=the number of resets for the pixel in row i and column j.

$V_R$=the residual value of the pixel=the voltage or charge measured, between the last of n random resets that have occurred and the end of the exposure time interval T.

$T_R$=the exposure time interval during which $V_R$ is collected.

$V_R$ij=the residual value for the pixel in row i and column j.

VR=the residual image comprised of all of the $V_R$ij values

N is an integer which is the multiplier by which the dynamic range is to be expanded in an image.

N−1=the maximal number of resets assumed, for any of the pixels. (If some pixels are exceptional, by having more than N resets, they are viewed as artifacts or as saturated points.)

$V_M$=the value at which the pixel voltage is reset.

$V_m$=the value to which the pixel voltage is reset.

epsilon=a correction factor, compensating for photons lost during the n reset recovery-times.

$V_S$=the saturation value of the pixel voltage, which is slightly larger than $V_M$.

n-set=a set of contiguous pixels having the same number of resets=n. There may be more than one such set in an image with no contiguity between them.

G=the maximal number of grey levels in the image pixels; therefore, 0<$V_R$ij<G.

2g=G/N=the number of gray levels in the residual image, itself.

Jump=the value difference between adjacent pixels.

JU=the maximum jump which is acceptable.

The continuity assumption: It is assumed that for the entire true image the possible "jump" between any pair of adjacent pixels is smaller than JU. We define here: JU=g−1.

The adjacent pixel inference rule: This rule is applied when there is a pixel known to have n resets and it is desired to infer the number of resets for an adjacent pixel (or when there is a pixel of an n-set known to have n resets and it is desired to infer the number of resets for pixels of the adjacent n-set). If the residual pixel value for the known pixel is denoted as $V_R$ and the adjacent pixel as $V_R(adj)$, then the rule is:

1. The pixels have the same number n if: $Abs[V_R-V_R(adj)]<JU$
2. $V_R(adj)$ has a higher value=n+1, if: $[(V_R(adj)+G)-V_R]]<JU$
3. $V_R(adj)$ has a lower value=n−1, if: $[(V_R+G)-V_R(adj)]<JU$ The basic formula for calculating VT is:

$$V_{Tij}=(n\times(V_{Mij}-Vmij))+V_{Rij}+\text{epsilon}(ij).$$

In other embodiments of the innovation, related to other reset mechanisms, the basic formula is somewhat modified, e.g. as has been described hereinabove. The description of the examples of reconstruction methods below, use the above mentioned formulae for Vt. In other embodiments of the innovation, modifications of the methods below using different basic formulae for Vt, could be easily derived by persons skilled in the art.

The following few examples for reconstruction algorithms are provided merely to illustrate the invention and are not intended to limit the scope of the invention in any manner. The reconstruction algorithms can be executed entirely in the central sensor-chip logic-area or partially or entirely on an external (to the sensor chip) device such as a different signal processing unit inside the image processing device or on another computer/device.

Method 1:

A trajectory of pixels, which are ordered for sequential treatment ("visits") of the algorithmic process, is chosen. Along the trajectory each pixel is visited following a visit to an adjacent neighbor. The values n, for each pixel, are determined sequentially by using the continuity assumption and the adjacent pixel inference rule (defined hereinabove). If the continuity assumption holds for the whole image, the set of n-values is obtained correctly at the end of the first iteration after all the pixels in the image array have been visited. True image VT can then be calculated, using the above described basic formula.

The estimation of whether an adjacent pixel belongs to another (over the border) n-set will always be made starting with two hypothesis: 1) It belongs to the same n-set, 2) It belongs to the neighboring (n+1) set or (n−1) set. The chosen hypothesis will normally be the one which is implied by the lowest jump (change of intensity). If the trajectory towards the estimated pixel is characterized by a slope, the estimate will be defined as the prediction based on a weighted linear (or curved) slope extrapolation plus a jump, wherein the jump is defined as the deviation from the extrapolation value, either weighted or un-weighted. If an error is made during processing and a pixel is estimated to belong to an adjacent n-set (beyond the boundary into a neighboring n-set), such an estimate can be better verified, thereby increasing the probability of a correct estimate. This can be done by further analysis of the hypothesis through observation of other adjacent pixels sequentially along the first order estimate of the boundary trajectory. It is noted however there exists the danger that an end of a slope is "sudden" and an error may result. This danger can be minimized or corrected for by limiting the allowed extrapolation to a value sufficiently smaller than the maximal jump that is assumed.

In a more advanced versions of the algorithm a finite, yet small, probability that the continuity assumption may be violated for some inferences of adjacent n-values will be assumed. Wherein, the higher the value of N the higher will be the probability for the occurrence of such violations. Thus some jumps, larger than g, may occur. Such jumps may produce a few wrong n-inferences along specific trajectories used to visit the pixel. If the resulting errors are not corrected then corresponding artifacts will occur in the reconstruction calculations. Therefore, advanced versions of the algorithm will introduce procedures of corrections, employing a succession of iterations, in each of which the whole pixel array is treated. Also the algorithm will include procedures for determining confidence levels for each interim result, thereby allowing statistical methods to be employed to improve the final result. Each such iteration, utilizing trajectories with different pixel orderings, will identify violations automatically and gradually converge to a reduced (or zero) number of n-errors. The corrected n-values will facilitate final reconstructions with fewer (if any) artifacts.

Once the n-values of the pixels are determined, after error corrections if necessary, the pixels are grouped into n-sets, the n-sets, which are still only relatively ordered, are then ordered among themselves. The value n=0 is then assigned to the lowest set in the order and higher n values are then assigned in order, for the other n-sets, in a consistent manner, up to the highest n value (n<N).

One advanced version of the above algorithm works as follows: First a trajectory of pixel visits is determined. Then the n-inference for each new pixel is made from all of the adjacent pixels that have already been estimated or reference neighbors. Except for the two initial pixels there will usually be 2 or more such neighbors. Normally all the n inferences per new pixel will be identical. If not, in some incidents, a maximum likelihood estimate of an integer n-step is produced on the basis of the relevant inference details and a "non-final" estimate is then assigned. The originally intended trajectory is then interrupted and changed so as to approach the "non-finalized" pixel from a different direction. Using the new trajectory, the n-value is estimated again and a new maximum likelihood estimate is generated, by including all the additional reference pixels. If this estimate is consistent with all the estimates generated previously, the new estimate is adopted. This procedure is repeated for all the regions of the image, until all pixel inferences are completed. If there are left pockets of inconsistent estimates, (identifiable by the existence of inconsistencies on closed trajectory test loops) combinatorial trials of modified estimates can be applied, until consistencies are achieved.

If a picture is bounded with a "limited dynamic range" except for a few relatively small very bright areas comprising a few adjacent pixels, then the methods described above will not cause many artifacts. This should be so, even if the too bright spots in the image are represented by values that are lower than their true values. If the brightness exceeds that defined by the number N there will be image spots that will be displayed as saturated. But even in this case, annoying blooming should always be prevented since $V_M$ is set below the saturation level. More generally, even if there are errors in values $V_T$, which correspond to n=1 and higher, the image should be superior to images that would have been otherwise saturated below that value.

Method 2:

According to this method the array of pixels is divided into two groups: The first is a main group of pixels that are reset individually whenever the charge in them reaches $V_M$. The second group is a sparse sub-array of pixels comprised of, for example, of every fourth pixel (horizontally and vertically) in the entire array. This sub-array is created by making a small hardware modification such that the pixels of the sub-array will have an integration time which is shorter than T, e.g. T/N. This can be achieved by a simultaneous start reset to the pixels of the sub-array that is applied T/N time units before the end of the basic exposure interval T.

If the dynamic range multiplier is N, then all (or almost all) the pixels in the sub-array, will not encounter any saturation reset (because of their sufficiently shortened exposure time. Thus, the n value for each of these pixels (i.e. the number of resets that each pixel would have had undergone in a full exposure interval T) can be estimated. This estimate is given, for a pixel reading V, by: n=modulu[V*N/((V_M−V_m)+epsilon)], where epsilon similar to the previously used correction function.

Once the n-estimates are generated for the sub-array, the normal continuity rule can be applied to estimate the n-values for the full array by making local inferences from each pixel to the surrounding group of nearest neighboring pixels in the main array. It can be stated that the probability of error for such n estimates, will be relatively small, unless the value of N becomes too high.

The "true values" of the pixels of the main array are now reconstructed, by use of the basic equation. The counterpart values of the pixels of the sub-array are also reconstructed by the simple formula $V_T=V*N$. Since these values stem from a shorter exposure (of the sub-array) they may be too noisy. In order to reduce the noise for the values for these sub-array pixels, their values can now be replaced by an extrapolation from the adjacent, earlier reconstructed, pixels of the main array. Such an extrapolation could also be performed with the aid of some smoothing technique. A full (compound) image is then available. In this case, even if some errors in the n-estimates of the sub-array (and consequently for the main array neighborhood) are made, they are correctable by applying the technique in method 1, i.e. by approaching any relevant neighborhood, i.e. the neighborhood of an "erroneous" pixel of the sub-array, from surrounding neighborhoods, which in all likelihood have been reconstructed correctly. The convergence to the consistent n-estimates and the corresponding "true values" is shorter here because of the limited size of each neighborhood.

It is to be noted that the above methods have been explained for an implicit assumption that the array is comprised of pixels sensitive to a single color. Applying the method of the invention to a multicolor array is trivial. It can be done in a few ways, for example, by dividing the main image array into a number of one-color sub-arrays, e.g. three such arrays corresponding to red, green and blue, which can be independently treated. The above described algorithms can then be applied for each such sub-array and then integrated to form the unified image. Another alternative method for applying the method of the invention to multicolor arrays is to apply the algorithm to regional luminance values, wherein the ratio among colors is locally fixed and changes only continuously with relatively little variations over the whole array. Once the luminance is determined, the specific colors in each location are then further determined.

A shorter exposure time for the above defined (method 2) sub-array, could also be achieved by use of an attenuating cover over the sub-array pixels. This cover could be designed to reduce the illumination of the covered pixels by a factor of, e.g. 1/N. Using this method there is no need for a delayed starting trigger and the associated hardware modification; however it would be inconvenient if the versatility of the camera design dictates the necessity of varying the value N.

Method 3:

This method is based on the use of two time adjacent exposures. First the whole array is exposed for time T/N (as explained hereinabove for the sub-array in method 2). Secondly, the whole array is exposed for a full time T with the application of the saturation-reset mechanism. After the reading of the first exposure results is done as quickly as possible, the algorithm of Method 2 is applied. A potential problem here is that motion artifacts resulting from relative movement between the exposures may appear during the time that elapses between the two adjacent exposures.

Motion artifacts could be corrected, via a pre-process of mutual registration of two images of residual values. The first image is the sampled array of the fully exposed image obtained using the normal reset process. The second image is derived from the short exposure time image, e.g. T/N exposure time. For each pixel corresponding to the short exposure, an estimate of the "residual value" $V_R$ that would have been sampled if the exposure would have been of the full length T is computed. The formula for this estimate is: Trij=Tij*N−n*((V_M−V_m)+epsilon). where n is the previously defined estimate according to Method 2. A registration process is then applied to achieve a best correlation between the two images following some mutual shift. It is also possible to performed registrations restricted to localized parts in the second image. Once the registration process is completed, the rest of the reconstruction is straight forward. n-values derived from the short exposure time (T/N length) are performed. Those are then used for the reconstruction of the pixels of the fully exposed image, using the corresponding n estimates from the registration.

Although embodiments of the invention have been described by way of illustration, it will be understood that the invention may be carried out with many variations, modifications, and adaptations, without departing from its spirit or exceeding the scope of the claims.

The invention claimed is:

1. A method of expanding a dynamic range of an electronic imaging device, said method comprising:
   a. providing a sensor chip comprised of a one or two-dimensional array of pixels and a centrally located sensor-chip logic area, wherein a global exposure time interval of a frame begins with reset signals and ends with sample signals;
   b. providing a comparator and reset trigger circuit located at or near a site of each of said pixels, wherein said comparator triggers a reset mechanism when a voltage in a charged pixel reaches a reference voltage; whereby, during said global exposure time interval, each individual pixel can be self-reset several times, depending on an intensity of a radiation incident upon it, and, at an end of said global exposure time interval, each pixel contains only a residual value of voltage that remains from a last self-reset to the end of said global integration time interval; and
   c. providing an algorithm implemented on post acquisition data, wherein said algorithm comprises steps of:
      i. using a time and/or space continuity assumption and an adjacent pixel inference rule to determine a number of individual resets for each of said pixels; and ii. using said determined number of individual resets for each of said pixels, said residual value for each of said pixels, and a basic formula to determine a true image value for each of said pixels;

wherein, a true image is comprised of an array of said true image values for each of said pixels and a combination of said reset mechanism for each pixel in conjunction with the use of said algorithm allows a determination of said true image without the necessity of providing electronic components for counting and remembering the number of times that each of said pixels was reset.

2. A method according to claim 1, wherein the electronic imaging device comprises a CMOS sensor chip.

3. A method according to claim 1, wherein a threshold for a pixel saturation-reset signal is global.

4. A method according to claim 1, wherein different threshold mechanisms are used for each of a plurality of a sub-array of pixels.

5. A method according to claim 1 wherein different starting reset signals for the global exposure time interval of a frame can be applied to various sub-arrays.

6. A method according to claim 1, wherein a threshold-reset mechanism is operated by a central reset-enable signal and resets can occur when a pixel value has reached a threshold value and said reset-enable signal is on.

7. A method according to claim 1, wherein compare and threshold-reset electronics are time shared by a group of pixels; wherein during a predetermined sequence, each pixel is connected to said electronics and a reset is generated to said pixel if it has passed a threshold.

8. A method according to claim 1, wherein a threshold-reset mechanism samples one pixel, or an average of several pixels, and performs the reset on a group of neighboring pixels, including said pixels that were sampled.

9. A method according to claim 1, wherein a source of the reference voltage that determines the reset value is provided from the central location in the sensor-chip logic area.

10. A method according to claim 1, wherein it is assumed that the continuity assumption holds for the whole pixel array and the algorithm comprises the following steps:
 a. choosing a trajectory of pixels, which are ordered for sequential treatment of the algorithmic process;
 b. visiting each pixel along the trajectory following a visit to an adjacent neighbor;
 c. determining sequentially n-values for each pixel by using said continuity assumption and the adjacent pixel inference rule relative to one or more of the already visited pixel values; and
 d. calculating the true image using the basic formula.

11. A method according to claim 10, wherein a finite, yet small, probability that the continuity assumption may be violated for some inferences of adjacent n-values is assumed resulting in a few wrong n-inferences along specific trajectories used to visit a pixel and the resulting errors are corrected by introducing correction procedures into the algorithm; wherein such procedures comprise:
 a. determining the n-values of the pixels by employing, for the whole pixel array, a succession of iterations utilizing trajectories with different pixel orderings, which will identify violations automatically and gradually converge to a reduced (or zero) number of n-errors;
 b. grouping the pixels into relatively ordered n-sets, after error corrections if necessary;
 c. assigning a value n=0 to a lowest set in the order;
 d. assigning higher n values in order, for the other n-sets, in a consistent manner, up to a highest n value; and
 e. incorporating a determined confidence level associated with each of a plurality of estimated n-values in an estimate of the following n-values.

12. A method according to claim 11, wherein step a. of the algorithm comprises the following steps:
 a. determining a trajectory of pixel visits,
 b. making an n-inference for each new pixel from all adjacent pixels that have already been estimated or reference neighbors;
 c. producing an estimate of an integer n-step, on a basis of relevant inference details including incorporation of previously determined confidence levels associated with earlier estimates, if all the n inferences for said new pixel are not identical;
 d. assigning a "non-final" estimate for the n-value of said pixel;
 e. interrupting and changing said original trajectory, when necessary, so as to approach said "non-finalized" pixel from a different direction;
 f. estimating the n-value again incorporating said new trajectory;
 g. generating a new maximum likelihood estimate by including all the additional reference pixels;
 h. adopting said new estimate if it is consistent with all previously generated estimates;
 i. repeat steps e to g if said new estimate is not consistent with all the previously generated estimates;
 j. repeating steps a to i for all regions of the pixel array, until all pixel inferences are completed; and
 k. applying combinatorial trials of modified estimates if there are left pockets of inconsistent estimates until consistencies are achieved.

13. A method according to claim 12, wherein the estimate of an integer n-step is made using a maximum likelihood type of estimate.

14. A method according to claim 1, wherein the array of pixels is divided into a main group of pixels that are reset individually during the global exposure time interval whenever the voltage of the individual pixel of said main group reaches the reference voltage and a sparse sub-array of pixels whose integration time or sensitivity are altered such that a voltage of essentially all of said pixels of said sub-array reaches said reference voltage only if the light intensity on such pixel is higher then a predetermined maximal light intensity.

15. A method according to claim 14, wherein the sub-array is created by making a small hardware modification such that the pixels of said sub-array will have an integration time which is shorter than the global exposure time interval.

16. A method according to claim 14, wherein a reduced sensitivity for the sub-array, could also be achieved by use of an attenuating cover for these pixels, which would reduce the intensity of the radiation falling on said covered pixels.

17. A method according to claim 14, wherein the algorithm further comprises the steps of:
 a. estimating, by direct calculation, n-values for each of the pixels of the sub-array;
 b. applying the n-value estimates for said sub-array and continuity rules to estimate n-values for the main group by making for each sub-array estimate inferences concerning a group of nearest neighboring pixels in said main group;
 c. using the estimated n-values for each pixel in said main group to calculate the "true values" of the pixels in said main group, and d. calculating the compatibly scaled "true values" of said sub-array by direct compensation for the shortness of their integration time interval.

18. A method according to claim 17, wherein additional steps of data smoothing using final results for the main group are carried out to smooth values of the potentially noisier sub-array pixels.

19. A method according to claim 1, wherein two adjacent exposures having different exposure times are used, wherein:
   a. a first exposure time is the global exposure time interval and the pixels are reset individually whenever their voltage reaches the reference voltage; and
   b. a second exposure time is shortened such that the voltage of essentially all of said pixels reach said reference voltage only if the light falling on these pixels is stronger then a predetermined maximal light intensity;
said method comprising the steps of:
   i. estimating the n-values of the pixels of the short exposure time and,
   ii. using said n-values to reconstruct true n-values of the pixels of the global exposure time interval.

20. A method according to claim 19, wherein motion artifacts are corrected by the following steps:
   a. applying a registration method comprising repeatedly trying incremental shifts between a residual image of the full global exposure time interval and a reconstructed estimate of residual values derived from the short exposure time image until maximal correlation is achieved;
   b. deriving n-estimates for the pixels of the short exposure time and associating said n-estimates to the registration fitted pixels of the global exposure time interval, and
   c. estimating true n-values for the pixels of the global exposure time image from said n-estimates.

21. A method according to claim 19, wherein motion artifacts are corrected by applying a registration method that adaptively and successively treats different image regions.

22. A method according to claim 1, wherein the electronic imaging device comprises pixels sensitive to light having one color or subsets of pixels each of which is sensitive to the same or different colors.

23. A method according to claim 1, wherein the comparator is connected to each pixel site in one of the following ways:
   a. a comparator is located at each of said sites;
   b. each of said sites is connected to a comparator shared by a group of pixels; and
   c. a group of sites are connected to a single comparator and additional circuitry; wherein a resultant reset affects a group of neighboring pixels that can or can not be members of said group that is connected to said comparator.

24. An electronic imaging device having expanded dynamic range, said device comprising:
   a. a sensor chip comprised of a two-dimensional array of pixels;
   b. a centrally located sensor-chip logic area, comprising circuitry for controlling a global exposure time interval of a frame beginning with reset signals and ending with sample signals;
   c. a comparator and reset trigger circuit located at or near a site of each of said pixels, wherein said comparator triggers a reset mechanism when voltage in a charged pixel exceeds a reference voltage; whereby, during said global exposure time interval, each individual pixel can be self-reset several times, depending on an intensity of the radiation incident upon it, and, at an end of said global exposure time interval, each pixel contains only a residual value of voltage that remains from a last individual self-reset to the end of a global integration time; and
   d. processing circuitry for carrying out at least part of an algorithm which uses said residual values of voltage to determine a true image value for each of said pixels;
wherein, a true image is comprised of an array of said true image values for each of said pixels and a combination of said reset mechanism for each pixel in conjunction with the use of said algorithm allows a determination of said true image without the necessity of providing electronic components for counting and remembering the number of times that each of said pixels was reset.

25. An electronic imaging device according to claim 24, further comprising pixels sensitive to light having one color or subsets of pixels each of which is sensitive to the same or different colors.

26. An electronic imaging device according to claim 24, wherein the comparator is connected to each pixel site in one of the following ways:
   a. a comparator is located at each of said sites;
   b. each of said sites is connected to a comparator shared by a group of pixels; and
   c. a group of sites are connected to a single comparator and additional circuitry, wherein the resultant reset affects a group of neighboring pixels that can or cannot be members of said group that is connected to said comparator.

* * * * *